UNITED STATES PATENT OFFICE.

RALPH W. KING, OF THE DALLES, OREGON, ASSIGNOR TO PACIFIC EVAPORATOR COMPANY, OF PORTLAND, OREGON, A CORPORATION OF OREGON.

METHOD OF PREPARING EVAPORATED VEGETABLES.

1,259,632.   Specification of Letters Patent.   Patented Mar. 19, 1918.

No Drawing.   Application filed June 27, 1916. Serial No. 106,146.

*To all whom it may concern:*

Be it known that I, RALPH W. KING, a citizen of the United States, residing at The Dalles, in the county of Wasco and State of Oregon, have invented new and useful Improvements in Methods of Preparing Evaporated Vegetables, of which the following is a specification.

This invention relates to a method of preparing evaporated vegetables and consists in certain improvements therein as will be hereinafter fully described and pointed out in the claims.

The invention has reference to the evaporation of vegetables in its broader sense including what are commonly termed "fruits".

In carrying out my process the vegetable is ordinarily prepared, sliced, and subjected to any desirable treatment prior to the evaporation of the moisture. This invention relates more particularly to the evaporation of the moisture.

The vegetables are subjected to a current of air heated to a temperature between 125° and 156° Fahrenheit, preferably about 150°. Heretofore vegetables have been evaporated at temperatures above this temperature and also with air artificially treated at temperatures below 125° Fahrenheit but these are subject to objection.

By keeping the temperature below 156° Fahrenheit, which is the temperature at which vegetables begin to cook, a breaking down of the vegetable or fruit cells is obviated so that the vegetable maintains the natural cells and natural quality and upon the addition of moisture will return to very near its previous condition.

If the air is changed with sufficient frequency, or in other words, the circulation is sufficiently rapid and of sufficient volume no molding, fermentation, or re-absorption will take place at a temperature above 125°. In the evaporating process the vegetables apparently sweat and if the drying process is not sufficiently rapid there is a re-absorption, molding or fermentation any of which are objectionable and will produce imperfect product.

Between these temperatures air of atmospheric humidity may be used. While this is sufficient at these temperatures to effect perfect evaporation the quality of the air is such as to prevent surface sealing and consequently there is an evaporation extending throughout the material.

What I claim as new is:—

1. The method of preparing evaporated vegetables which consists in subjecting the same to a current of air at a temperature not less than 125° and not more than 156° Fahrenheit.

2. The method of preparing evaporated vegetables which consists in subjecting the same to a current of air at a temperature between 125° and 156° Fahrenheit, said air having atmospheric humidity.

3. The method of preparing evaporated vegetables, which consists in subjecting the same to a current of air between 125° and 156° Fahrenheit, said air having at least atmospheric humidity.

In testimony whereof I have hereunto set my hand.

RALPH W. KING.